(12) United States Patent
Fraccon et al.

(10) Patent No.: US 7,208,701 B2
(45) Date of Patent: Apr. 24, 2007

(54) METHOD OF STEAM COOKING

(75) Inventors: Stefania Fraccon, Varese (IT); Tamara Distaso, Gemonio (IT)

(73) Assignee: Whirlpool Corporation, Benton Harbor, MI (US)

( * ) Notice: Subject to any disclaimer, the term of this patent is extended or adjusted under 35 U.S.C. 154(b) by 153 days.

(21) Appl. No.: 11/120,454

(22) Filed: May 3, 2005

(65) Prior Publication Data

US 2006/0289438 A1    Dec. 28, 2006

(51) Int. Cl.
*A21B 1/24* (2006.01)
*A21B 1/40* (2006.01)

(52) U.S. Cl. ............ 219/401; 219/413; 219/490; 219/492; 219/494; 99/330; 99/333; 99/468; 126/510; 126/523

(58) Field of Classification Search ............ None
See application file for complete search history.

(56) References Cited

U.S. PATENT DOCUMENTS

| | | | |
|---|---|---|---|
| 3,518,949 A | 7/1970 | Stock | |
| 4,058,635 A | 11/1977 | Durth | 426/509 |
| 4,426,923 A | 1/1984 | Ohata | 99/468 |
| 4,623,780 A | 11/1986 | Shelton | 219/401 |
| 4,817,582 A * | 4/1989 | Oslin et al. | 126/20 |
| 4,920,948 A | 5/1990 | Koether et al. | 126/21 |
| 4,924,071 A | 5/1990 | Jacobs | 219/400 |
| 5,215,000 A * | 6/1993 | Desage et al. | 126/20 |
| 5,411,753 A | 5/1995 | Tippmann | 426/510 |
| 5,710,409 A * | 1/1998 | Schwarzbacker et al. | 219/506 |
| 5,938,959 A * | 8/1999 | Wang | 219/401 |
| 6,323,464 B1 | 11/2001 | Cohn | 219/401 |
| 6,497,907 B2 | 12/2002 | Hofer | 426/233 |
| 6,545,251 B2 | 4/2003 | Allera et al. | 219/394 |

FOREIGN PATENT DOCUMENTS

FR    2652234 A1 *    3/1991

* cited by examiner

*Primary Examiner*—Joseph Pelham
(74) *Attorney, Agent, or Firm*—Robert O. Rice; Stephen Krefman; John F. Colligan

(57) ABSTRACT

A method of cooking food with steam in an automatic household oven comprises receiving a user inputted cooking temperature, receiving a user inputted steam level, and implementing a preprogrammed steam cooking cycle based on the user inputted cooking temperature and the user inputted steam level.

20 Claims, 6 Drawing Sheets

METHOD OF STEAM COOKING

BACKGROUND OF THE INVENTION

1. Field of the Invention

The invention relates to a method for steam cooking in an automated household oven.

2. Description of the Related Art

The benefits of cooking food with steam are widely recognized and include accelerating the cooking process, moisturizing the food during the cooking process, and preserving vitamins and nutrients in the food. Some contemporary household ovens incorporate an automated steam generating system that introduces steam into the cooking cavity of the oven. During the cooking cycle, steam can be generated and introduced into the cavity according to a manual cooking program, or the user can select an automatic cooking program customized for the particular type of food being cooked. While the manual cooking cycle is simpler to implement with respect to the oven controller, it is possible that the user can enter inappropriate inputs for the manual cooking cycle, and the food can become dry, insufficiently moist, or soggy. The automatic cooking cycles can be more reliable or eliminate or reduce guesswork by the user, but they are more complex to implement with respect to the oven controller. Additionally, when the automatic cooking cycles correspond to specific foods, the oven needs to have programs for implementing each individual cycle. Further, the user often cannot adjust the parameters of the food-specific automatic cycles if the user prefers for the food to be cooked in a different manner. Thus, it is desirable to have a method of steam cooking having a manual cooking cycle that is simple to implement and sufficiently adjustable to produce a desired cooked food item yet incorporates some automated aspects to eliminate the guesswork associated with prior art manual cooking cycles.

SUMMARY OF THE INVENTION

A method of cooking food with steam according to one embodiment of the invention in an automatic household oven with a cooking cavity, a heating system for heating the cooking cavity, and a steam system for introducing steam into the cooking cavity comprises receiving a user inputted cooking temperature, receiving a user inputted steam level, and implementing a preprogrammed steam cooking cycle based on the user inputted cooking temperature and the user inputted steam level.

The implementing can comprise setting a rate for increasing the temperature in the cavity to the user inputted cooking temperature. The setting of the rate can comprise setting a first heating rate for increasing the temperature in the cavity to a first temperature less than the user inputted cooking temperature. The first temperature can be the boiling point of water. The first heating rate and the first temperature can be independent of the user inputted cooking temperature and the user inputted steam level. The setting can comprise setting a second heating rate for increasing the temperature in the cavity from the first temperature to the cooking temperature.

The implementing can comprise characterizing the user inputted cooking temperature as a cooking temperature level. The cooking temperature level can be one of a high temperature level and a low temperature level.

The implementing can comprise setting a steam generation rate to achieve the user inputted steam level. The setting of the steam generation rate can comprise setting a duty cycle of the steam system. The steam generation rate can be one of a high steam generation rate and a low steam generation rate. The high steam generation rate can correspond to about a 100% duty cycle. The low steam generation rate can correspond to about an 80% duty cycle.

The implementing can comprise setting a duration of steam introduction. The method can further comprise receiving a user inputted cooking cycle time for the preprogrammed cooking cycle. The setting of the duration of steam introduction can comprise calculating the duration of steam introduction as a percent of the user inputted cooking cycle time.

The implementing can comprise operating the heating system to raise the temperature of the cavity to a first temperature prior to raising the temperature of the cavity to the user inputted cooking temperature. The implementing can further comprise setting a steam generation rate to achieve the user inputted steam level. The implementing can further comprise delaying steam introduction at the steam generation rate until temperature reaches the first temperature. The first temperature can be the boiling point of water.

DESCRIPTION OF THE PREFERRED EMBODIMENT

Figure 1:
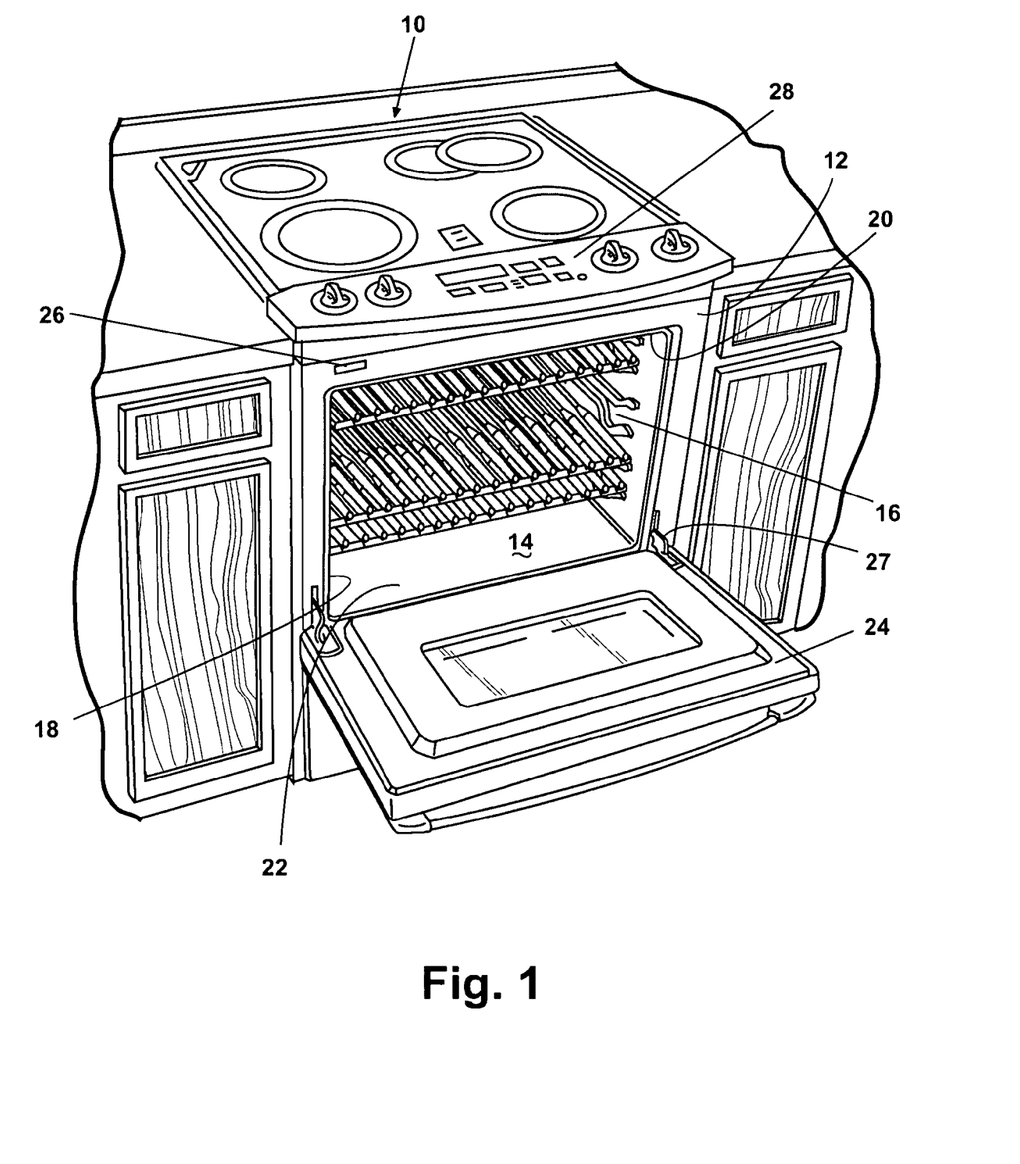
FIG. 1 is a perspective view of an exemplary automatic household oven.
Figure 2:
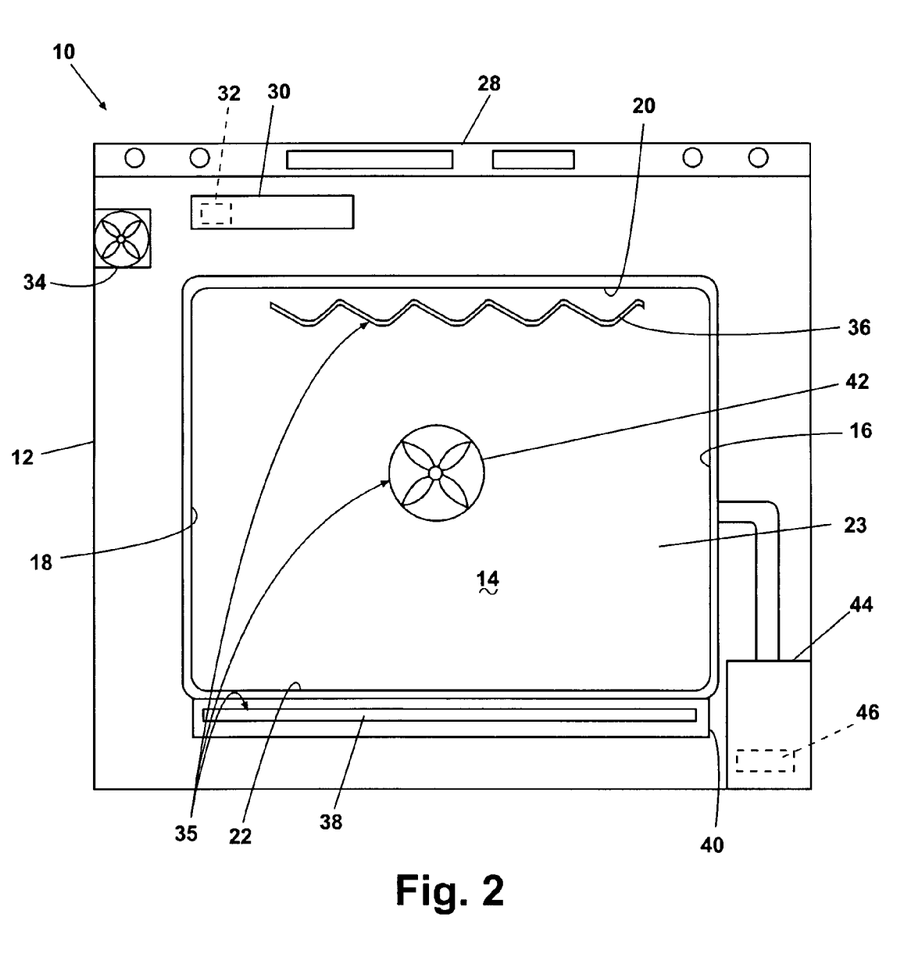
FIG. 2 is a schematic view of the oven of FIG. 1.

Referring now to the figures, FIG. 1 illustrates an exemplary automatic household oven 10 that can be used to implement a method of steam cooking according to one embodiment of the invention. The oven 10 comprises a cabinet 12 with an open-face cooking cavity 14 defined by cooking cavity walls: a pair of spaced side walls 16, 18 joined by a top wall 20, a bottom wall 22, and a rear wall 23 (FIG. 2). A door 24 pivotable at a hinge 27 selectively closes the cavity 14, and a sensor 26 detects an open position of the door 24 and a closed position of the door 24. When the door 24 is in the open position, a user can access the cavity 14, while the door 24 in the closed position prevents access to the cavity 14 and seals the cavity 14 from the external environment.

The oven 10 further comprises a control panel 28 with a user interface accessible to the user for inputting desired cooking parameters, such as temperature and time, of manual cooking programs or for selecting automated cooking programs. The user interface can comprise, for example, a push button, a rotatable knob, a touch pad, a touch screen, or a voice command unit. The control panel 28 communicates with a controller 30 located in the cabinet 12, as shown in FIG. 2. The controller 30 can be a proportional-integral-derivative (PID) controller or any other suitable controller, as is well-known in the automatic oven art. The controller 30 stores data, such as default cooking parameters, the manually input cooking parameters, and the automated cooking programs, receives input from the control panel 28, and sends output to the control panel 28 for displaying a status of the oven 10 or otherwise communicating with the user. Additionally, the controller 30 includes a timer 32 for tracking time during the manual and automated cooking programs and a cooling fan 34 located in the cabinet 12 for drawing cooling air into the cabinet 12 and directing the air toward the controller 30 to avoid overheating of the controller 30 by heat conducted from the cavity 14. The cooling air flows around the outside of the cooking cavity walls 16, 18, 20, 22, 23.

With continued reference to FIG. 2, the oven 10 further comprises a heating system 35 having an upper heating element 36, commonly referred to as a broiler, and a lower heating element 38. The schematic illustration of the FIG. 2 shows the lower heating element 38 as being hidden or mounted beneath the cooking cavity bottom wall 22 in a heating element housing 40. Heat from the lower heating element 38 conducts through the bottom wall 22 and into the cavity 14. Alternatively, the lower heating element 38 can be mounted inside the cavity 14, as is well-known in the oven art. Further, the upper and lower heating elements 36, 38 can be mounted at the side walls 16, 18 of the cavity 14, as disclosed in U.S. Pat. No. 6,545,251 to Allera et al., which is incorporated herein by reference in its entirety. During use, the upper heating element 36 creates upper heat, or heat emanating from the upper heating element 36 to an upper portion of the cavity 14, and the lower heating element 38 creates bottom heat, or heat emanating from the lower heating element 38 to a lower portion of the cavity 14. The heating system 35 according to the illustrated embodiment further comprises a convection fan 42 that circulates air and steam, when present, within the cavity 14. The convection fan 42 can be any suitable fan and can be mounted in any suitable location of the cavity 14, such as in the rear wall 23.

In addition to the heating system, the oven 10 comprises a steam system 44 preferably mounted within the cabinet 12 and configured to introduce steam into the cavity 14. The steam system 44 in the illustrated embodiment comprises a boiler 46 that heats water stored in the steam system 44. However, the steam system 44 can be any suitable system that is capable of introducing steam directly into the cavity 14 or introducing water that is turned into steam in the cavity 14 and is not limited to the system shown schematically in FIG. 2.

Figure 3:
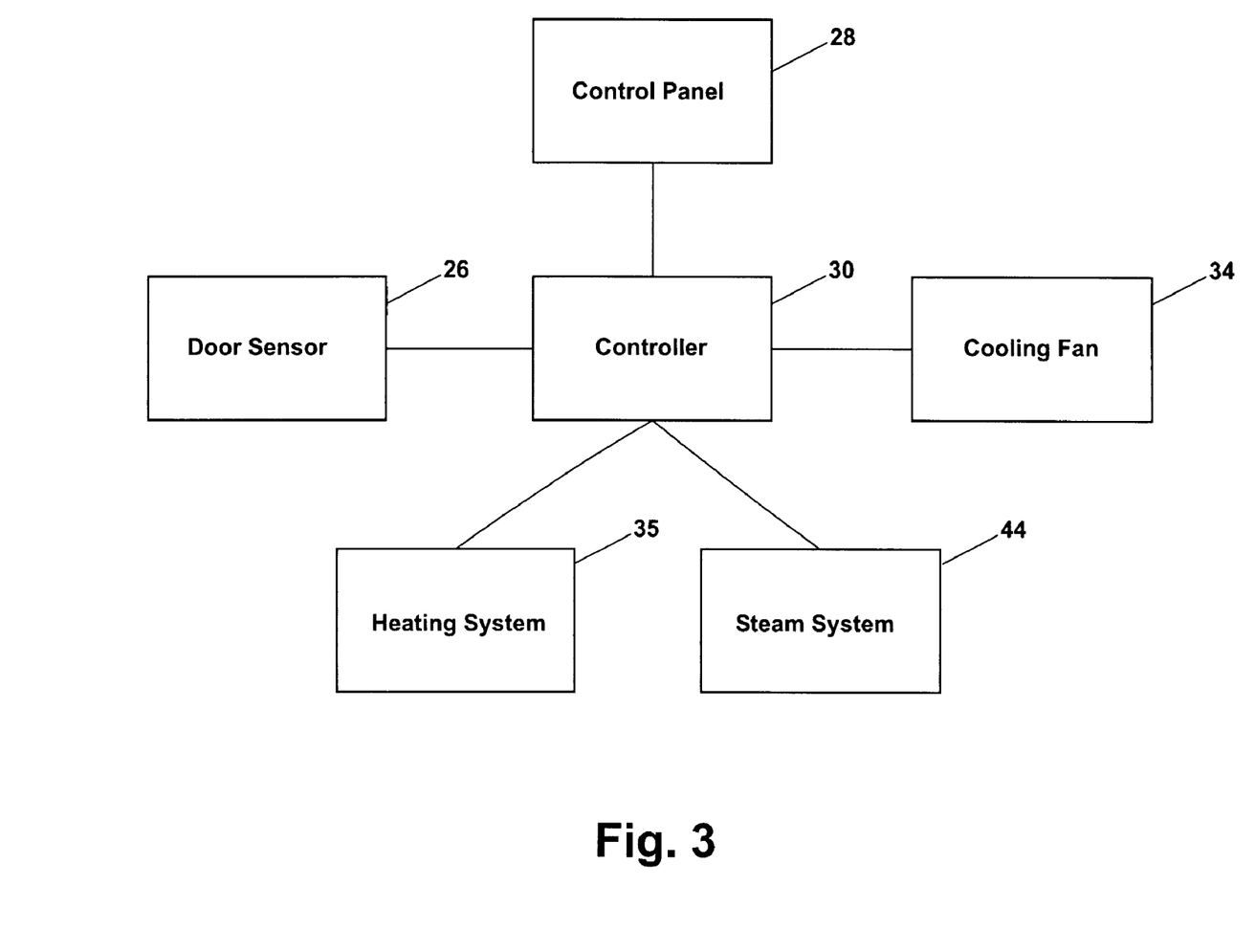
FIG. 3 is a schematic diagram illustrating a controller of the oven of the FIG. 1 and exemplary components in operative communication with the controller for executing a method of steam cooking according to one embodiment of the invention.

FIG. 3 is a block diagram that schematically illustrates a control system of the oven 10. The control system comprises the controller 30, which operably communicates with the control panel 28, as described above, the door sensor 26, the cooling fan 34, the heating system 35, and the steam system 44. The door sensor 26 communicates to the controller 30 the open or closed position of the door 24, and the controller 30 communicates with the cooling fan 34 to activate or deactivate the cooling fan 34 to control the temperature of the controller 30. The controller 30 instructs the heating system 35 to activate or deactivate the upper heating element 36, the lower heating element 38, and the convection fan 42, either all together, individually, or in groups, and provides instructions regarding the desired temperature of the cavity 14 and the rate at which the heating system 35 heats the cavity 14. Similarly, the controller 30 instructs the steam system 44 to activate or deactivate the boiler 46 and provides instructions regarding the desired temperature of the water in the steam system 44 in order to achieve the desired relative humidity in the cavity 14.

Figure 4:
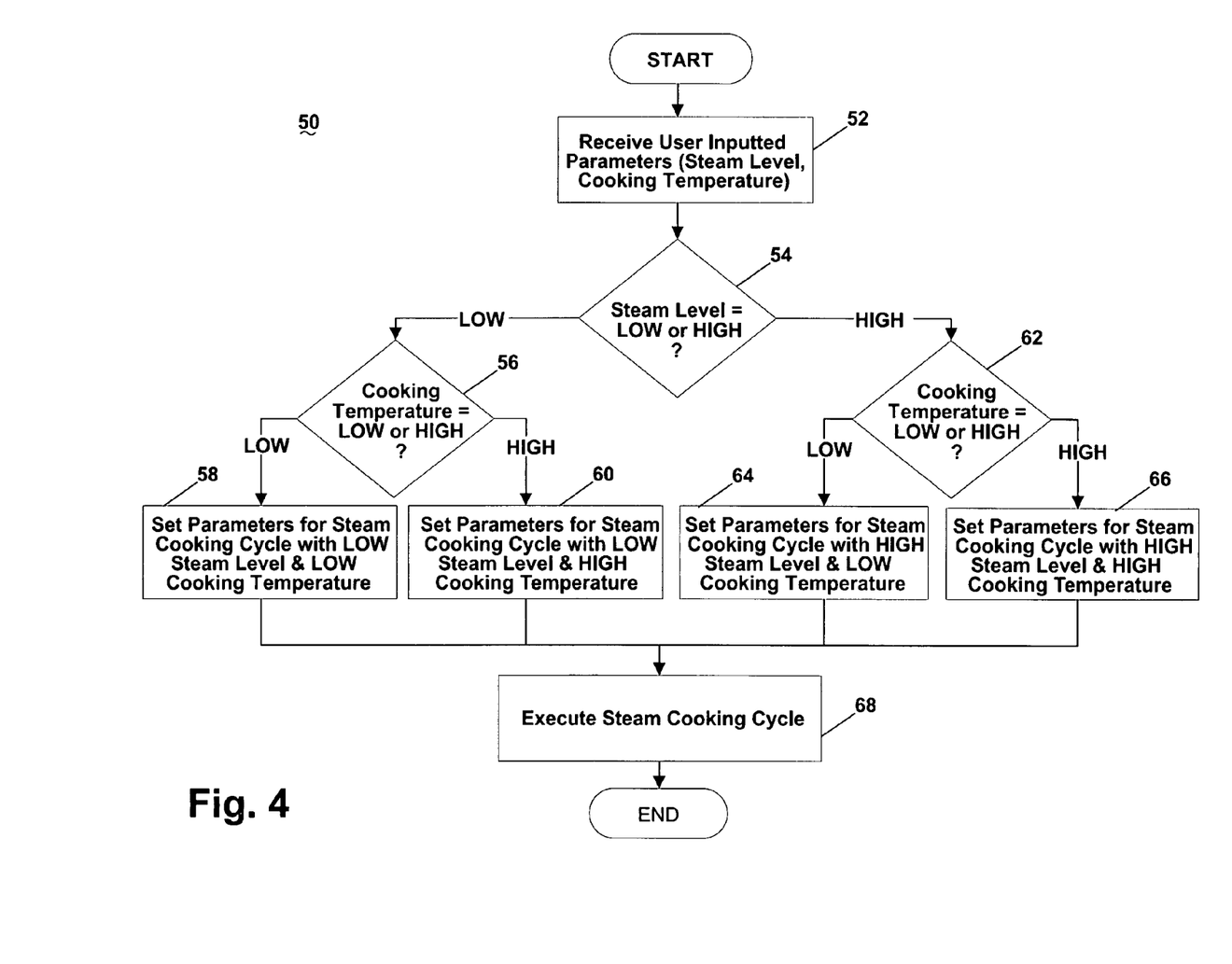
FIG. 4 is a flow chart depicting a method of steam cooking according to one embodiment of the invention.

As stated above, the exemplary oven 10 can be used to implement a method 50 of steam cooking, and FIG. 4 is a flow chart illustrating the method 50 according to one embodiment of the invention. In general, the method 50 can be characterized as comprising three phases: a first phase, wherein the controller receives parameters input by the user, a second phase where the controller 30 sets parameters for a steam cooking cycle based on the user inputted parameters, and a third phase wherein the controller 30 executes a steam cooking cycle in accordance with the parameters set in the second phase.

With continued reference to FIG. 4, the oven 10 receives the user inputted parameters in step 52 to begin the first phase of the method 50. The user inputted parameters can be input through the user interface on the control panel 28, which communicates the user inputted parameters to the controller 30.

According to one embodiment of the invention, the user inputted parameters comprise a steam level and a cooking temperature. According to the illustrated embodiment, the steam level is entered as a qualitative descriptor, such as LOW or HIGH, to indicate a desired relative steam level. Alternatively, the steam level can be entered as a quantitative steam level. The desired relative steam level depends on the type of food being cooked and a desired moisture level of the cooked food, as will be discussed in more detail hereinafter. The cooking temperature is preferably entered as a specific temperature, as is common with manual cooking cycles. The user inputted parameters can further comprise a cooking cycle time, which is the duration of the steam cooking cycle during the third phase of the method 50.

After the oven 10 receives the user inputted parameters, the controller 30 begins the second phase of the method 50 and determines if the steam level is LOW or HIGH in step 54. If the steam level is LOW, then the controller 30 determines if the cooking temperature is LOW or HIGH in step 56. Because the user inputted cooking temperature is entered as a specific temperature, the controller 30 can characterize the user inputted cooking temperature as a cooking temperature level according to preprogrammed ranges. According to the illustrated embodiment, the cooking temperature levels are LOW and HIGH. For example, if the cooking temperature falls within a range corresponding to LOW, then the cooking temperature is LOW, and, likewise, if the cooking temperature falls within a range corresponding to HIGH, then the cooking temperature is HIGH. If the controller 30 determines that the cooking temperature is LOW, then the controller 30 in step 58 sets parameters for the steam cooking cycle with the LOW steam level and LOW cooking temperature. Similarly, if the controller 30 determines that the cooking temperature is HIGH, then the controller 30 in step 60 sets parameters for the steam cooking cycle with the LOW steam level and HIGH cooking temperature.

Returning back to step 54, if the steam level is HIGH, then the controller 30 executes essentially the same process described in the preceding paragraph for the LOW steam level. In particular, the controller 30 determines in step 62 if the cooking temperature is LOW or HIGH and, in the former case, sets parameters for the steam cooking cycle with the HIGH steam level and LOW cooking temperature in step 64 or, in the latter case, sets parameters for the steam cooking cycle with the HIGH steam level and HIGH cooking temperature in step 66. Thus, it can be seen that according to the illustrated embodiment, the controller 30 characterizes the steam cooking cycle as having one of four cooking conditions: LOW steam level and LOW cooking temperature, LOW steam level and HIGH cooking temperature, HIGH steam level and LOW cooking temperature, and HIGH steam level and HIGH cooking temperature. After the parameters are set in one of the steps 58, 60, 64, and 66 corresponding to the desired cooking condition, the controller 30 executes the steam cooking cycle in step 68 for the third phase of the method 50.

Figure 5:
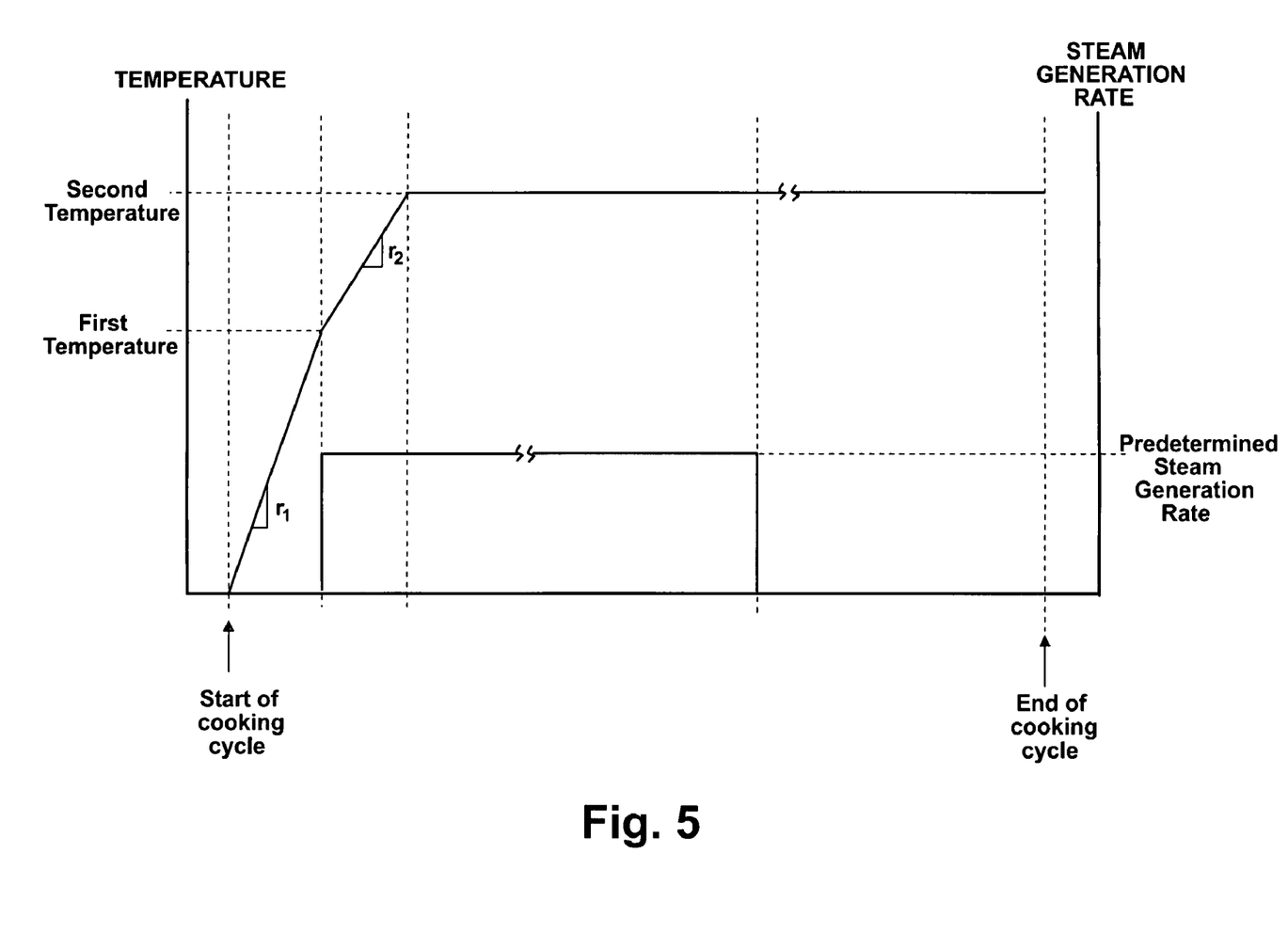
FIG. 5 is a schematic graph illustrating a temperature and a steam generation rate in a cooking cavity of the oven of FIG. 1 during an implementation of a steam cooking cycle during the execution of the method of steam cooking shown in FIG. 4.

An exemplary steam cooking cycle and corresponding temperature of the cavity 14 and rate of steam generation by the steam system 44 are illustrated schematically in FIG. 5. The steam cooking cycle is a generic cycle that can be customized by the parameters set in one of the steps 58, 60, 64, and 66. FIG. 5 is not intended to report actual behavior of the temperature and the steam generation during the steam cooking cycle; rather, FIG. 5 represents a general behavior of these properties. It will be apparent to one of ordinary skill in the oven art that, in reality, the actual temperature and the actual steam generation rate fluctuate about a target temperature, while holding a temperature or while increasing the temperature, and a target steam generation rate during the operation of the oven 10. Fluctuation can occur as a result of cycling components of the heating system 35, such as the upper and lower heating elements 36, 38, in the case of temperature, and components of the steam system 44, such as the boiler 46, in the case of steam generation rate, while attempting to achieve a set temperature and a set steam generation rate, respectively.

With continued reference to FIG. 5, the steam cooking cycle begins with a first preheating step in which the heating system 35 increases the temperature of the cavity 14 to a first temperature, which is a temperature at least equal to the boiling point of water, at a first preheating rate $r_1$. When the temperature of the cavity 14 reaches the first temperature, the heating system 35 increases the temperature of the cavity 14 from the first temperature to a second temperature at a second preheating rate $r_2$ during a second preheating step. According to one embodiment of the invention, the second temperature is equal to the cooking temperature, and the second preheating rate is less than the first preheating rate. The heating system 35 maintains the temperature of the cavity 14 at the second temperature for the remainder of the steam cooking cycle.

During the steam cooking cycle, the steam system 44 begins to generate steam when or after the temperature of the cavity 14 reaches the first temperature. Waiting until the temperature reaches the first temperature, which is preferably the boiling point of water, to initiate the steam system 44 ensures that the temperature of the cavity 14 is high enough to sustain steam in a vaporized state. As a result, the vapor will not condense in the cavity 14 and form water droplets on the walls 16, 18, 20, 22, 23, the food, or any other items in the cavity 14. Formation of water droplets on porcelain, which is a material found on the cavity walls 16, 18, 20, 22, 23 of many ovens, can undesirably damage the material. The steam system 44 generates steam at a predetermined steam generation rate for a steam generation time, which is a duration for the steam system 44 to generate steam and introduce steam into the cavity 14. According to one embodiment of the invention, the steam generation rate is governed by a duty cycle of the boiler 46, and an exemplary duty cycle for the boiler 46 is the percentage of time the boiler 46 is on (i.e., power is supplied to the boiler 46) during a certain time interval, such as 1 minute. Additionally, the steam generation time can be calculated as a percentage of the cooking cycle time input by the user. Thus, the steam generation can terminate before the end of the steam cooking cycle, as shown in FIG. 5, or at the end of the steam cooking cycle, depending on the parameter set by the method 50.

Figure 6:
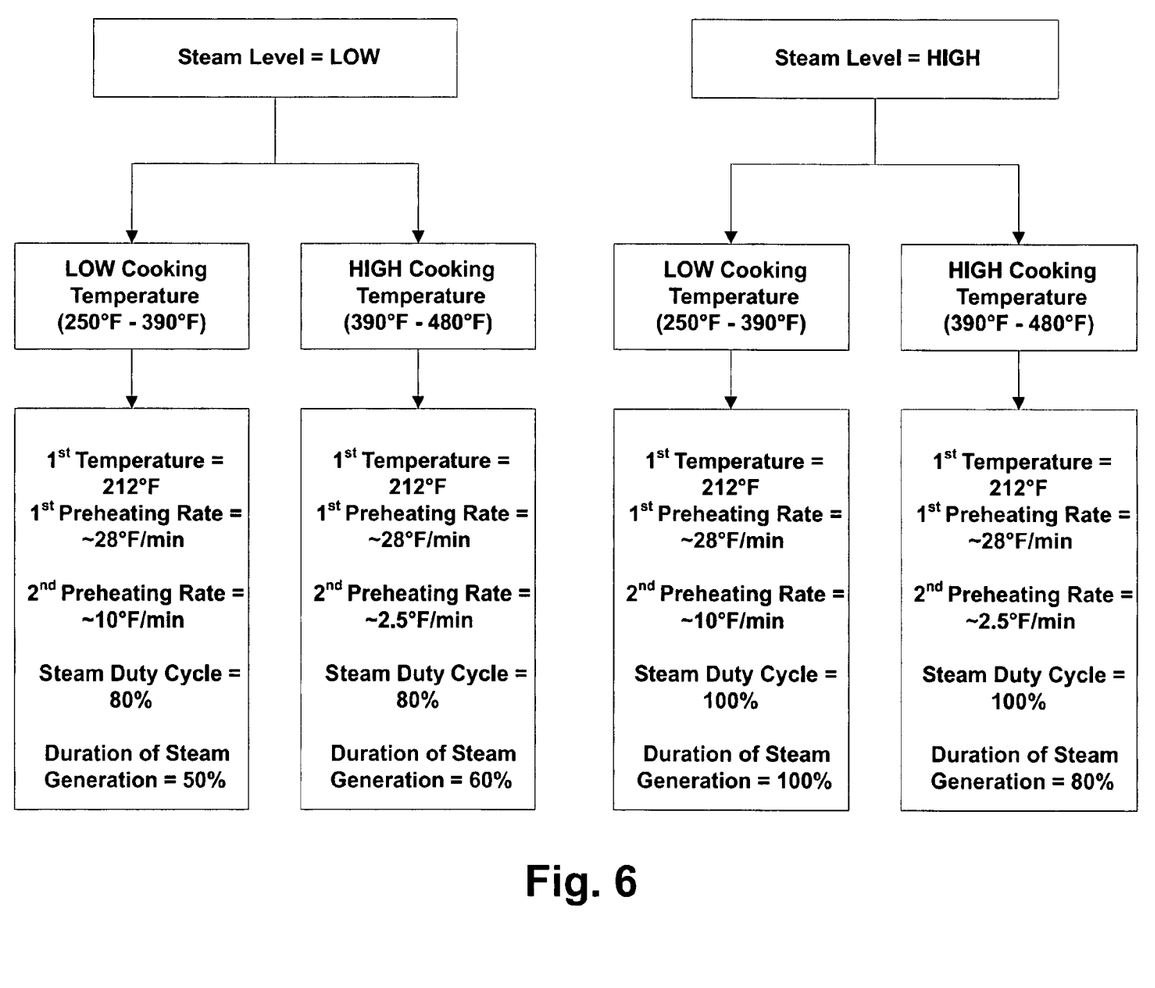
FIG. 6 is a schematic diagram of exemplary parameters for implementation of the steam cooking cycle shown in FIG. 5 for the method of steam cooking shown in FIG. 4.

According to one embodiment of the invention, the parameters set by the method at steps 58, 60, 64, and 66 for the steam cooking cycle shown in FIG. 5 comprise the first temperature, the first preheating rate, the second preheating rate, the steam generation rate, and the steam generation time. The steam generation rate is implemented by the steam duty cycle, as described above. Exemplary values for these parameters are shown in FIG. 6. The parameter values shown in FIG. 6 are dependent on the oven 10 utilized to implement the method and are presented here for illustrative purposes. Different ovens have different cooking cavity capacity, types of heating systems (e.g., some ovens do not have the convection fan 42 or the heating elements 36, 38 can have differing heat outputs), and types of steam systems, which affect the implementation of the method 50. For example, the above operational parameter values were determined with the cooling fan 34 operational during the entire cooking cycle. Because the cooling fan can draw away heat from the cooking cavity 14 though the cooking cavity walls 16, 18, 20, 22, 23, the cooling fan can affect the temperature of the cavity 14.

With continued reference to FIG. 6, the exemplary preprogrammed ranges for characterizing the LOW and HIGH cooking temperatures are 250° F.–390° F. and 390° F.–480° F., respectively. The first temperature and the first preheating rate are the same for all the cooking conditions and are equal to about 212° F. and about 28° F./minute, respectively. When the first temperature and the first preheating rate equal the values shown in FIG. 6, the cavity 14 reaches the first temperature in about 5 minutes. When the temperature is LOW, regardless of the steam level, the second preheating rate is about 10° F./minute, while the second preheating rate is about 2.5° F./minute when the temperature is HIGH, regardless of the steam level. Additionally, when the steam level is LOW, the steam duty cycle is about 80%, regardless of the cooking temperature, while the steam duty cycle is about 100% when the steam level is HIGH, regardless of cooking temperature. An exemplary steam generation rate that corresponds to a steam duty cycle of 100% is about 25–30 grams per minute. The parameter that is different, according to the example of FIG. 6, for each of the cooking conditions is the steam generation time. The steam generation time is calculated as a percentage of the user inputted cooking cycle time, and the percentages range from 50% to 100%.

The parameters shown in FIG. 6 can correspond to steam cooking cycles for certain types of foods, and the user can employ a reference, such as a user manual for the oven 10 or a cookbook provided with the oven 10 or separate from the oven 10, for suggested user inputted cooking temperatures and user inputted steam levels corresponding to the cooking conditions appropriate for certain types of foods. For example, the LOW steam level and LOW cooking temperature cooking condition and the HIGH steam level and LOW cooking temperature cooking condition are suitable for vegetables, for example, depending on the type of vegetable being cooked. The latter cooking condition can also be used for cakes. The other two cooking conditions are suitable for cooking a turkey, for example.

While the parameters for the steam cooking cycle are set by the method 50, it is within the scope of the invention for the user to manually alter one or more of the parameters according to the user's preferences. For example, if the user is cooking a food that, in the user's opinion, is not moist enough with the LOW steam level but is too moist with the HIGH steam level, then the user can alter the steam duty cycle to either increase the steam duty cycle for the LOW steam level or decrease the steam duty cycle for the HIGH steam level. The user can change one or more of the parameters either before the steam cooking cycle initiates or while the steam cooking cycle is implemented for a single running of the steam cooking cycle or can alter the default parameters so that the change affects every running of the steam cooking cycle. The user can change the parameters through the user interface on the control panel 28. Additionally, the user can change the user inputted cooking temperature, the user inputted steam level, and/or the user inputted cooking cycle time while the steam cooking cycle is implemented, if desired.

When the user desires to cook food using the inventive method 50, the user prepares the food, places the food along with a food support, if used, in the cavity 14, and closes the door 24. The user inputs the steam level, the cooking temperature, and the cooking cycle time through the user interface on the control panel 28. The user can initiate the inputting, or the inputting can be prompted by the user interface on the control panel 28. The controller 30 then executes the method 50 shown in the flow chart of FIG. 4 and described above. After the parameters are set in one of the steps 58, 60, 64, and 66 for the cooking condition corresponding to the user inputted steam level and user inputted cooking temperature, the steam cooking cycle is executed in step 68. Thereafter, the user removes the cooked food, which is cooked to a desired temperature and moistness, from the cavity 14.

As a result of the method 50, the user can manually select some parameters of the steam cooking cycle, such as the steam level, the cooking temperature, and the cooking cycle time, and the controller 30 determines other steam cooking cycle parameters suitable for the cooking condition corresponding to the user inputted parameters to ensure that the food is cooked properly. Thus, the method 10 is a partially automated manual cooking cycle. Additionally, the method 50 is simple to implement with respect to the oven controller 30, and the controller 30 stores and implements a single process for all types of food rather than having individual programs for different types of food.

While the steam levels and the cooking temperature levels have been described herein as LOW and HIGH, as these two groups have been found to be sufficient for cooking most foods, it is within the scope of the invention to utilize other levels and different quantities of levels. Additionally, the invention is not limited to use with the steam cooking cycle shown in FIG. 5. The steam cooking cycle shown in FIG. 5 is for illustrative purposes only, and other steam cooking cycles can be used with the method. Further, the particular parameters set for the steam cooking cycle in the method can change according to the steam cooking cycle utilized with the method as appropriate.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of cooking food with steam in an automatic household oven with a cooking cavity, a heating system for heating the cooking cavity, and a steam system for introducing steam into the cooking cavity, the method comprising:
   receiving a user inputted cooking temperature;
   receiving a user inputted steam level; and
   implementing a preprogrammed steam cooking cycle based on the user inputted cooking temperature and the user inputted steam level.

2. The method according to claim 1, wherein the implementing comprises setting a rate for increasing the temperature in the cavity to the user inputted cooking temperature.

3. The method according to claim 2, wherein the setting of the rate comprises setting a first heating rate for increasing the temperature in the cavity to a first temperature less than the user inputted cooking temperature.

4. The method according to claim 3, wherein the first temperature is the boiling point of water.

5. The method according to claim 3, wherein the first heating rate and the first temperature are independent of the user inputted cooking temperature and the user inputted steam level.

6. The method according to claim 3, wherein the setting comprises setting a second heating rate for increasing the temperature in the cavity from the first temperature to the cooking temperature.

7. The method according to claim 1, wherein the implementing comprises characterizing the user inputted cooking temperature as a cooking temperature level.

8. The method according to claim 2, wherein the cooking temperature level is one of a high temperature level and a low temperature level.

9. The method according to claim 1, wherein the implementing comprises setting a steam generation rate to achieve the user inputted steam level.

10. The method according to claim 9, wherein the setting of the steam generation rate comprises setting a duty cycle of the steam system.

11. The method according to claim 10, wherein the steam generation rate is one of a high steam generation rate and a low steam generation rate.

12. The method according to claim 11, wherein the high steam generation rate corresponds to about a 100% duty cycle.

13. The method according to claim 11, wherein the low steam generation rate corresponds to about an 80% duty cycle.

14. The method according to claim 1, wherein the implementing comprises setting a duration of steam introduction.

15. The method according to claim 14 and further comprising receiving a user inputted cooking cycle time for the preprogrammed cooking cycle.

16. The method according to claim 15, wherein the setting of the duration of steam introduction comprises calculating the duration of steam introduction as a percent of the user inputted cooking cycle time.

17. The method according to claim 1, where the implementing comprises operating the heating system to raise the temperature of the cavity to a first temperature prior to raising the temperature of the cavity to the user inputted cooking temperature.

18. The method according to claim 17, wherein the implementing further comprises setting a steam generation rate to achieve the user inputted steam level.

19. The method according to claim 18, wherein the implementing further comprises delaying steam introduction at the steam generation rate until temperature reaches the first temperature.

20. The method according to claim 19, wherein the first temperature is the boiling point of water.

* * * * *